United States Patent [19]

Hare

[11] 3,725,873

[45] Apr. 3, 1973

[54] CALCULATOR HAVING A SEQUENTIAL ACCESS STACK

[75] Inventor: George H. Hare, Oakland, Calif.

[73] Assignee: The Singer Company

[22] Filed: Apr. 7, 1971

[21] Appl. No.: 132,237

Related U.S. Application Data

[63] Continuation of Ser. No. 725,960, May 1, 1968, which is a continuation of Ser. No. 366,235, May 11, 1964, abandoned.

[52] U.S. Cl. .................................340/172.5, 235/156
[51] Int. Cl. .................................................G06f 3/14
[58] Field of Search ............340/172.5; 235/167, 171

[56] References Cited

UNITED STATES PATENTS

| | | | |
|---|---|---|---|
| 3,037,192 | 5/1962 | Everett | 340/172.5 |
| 3,047,228 | 7/1962 | Bauer et al. | 340/172.5 |
| 3,138,702 | 6/1964 | Heming | 340/172.5 |
| 3,150,351 | 9/1964 | Tackovich | 340/172.5 |
| 3,187,321 | 1/1965 | Kameny | 340/172.5 X |
| 3,240,120 | 3/1966 | Amdane | 340/172.5 |
| 3,248,705 | 4/1966 | Dammann | 340/172.5 |
| 3,234,524 | 2/1966 | Roth | 340/172.5 |
| 3,307,156 | 2/1967 | Durr | 340/172.5 |
| 3,319,226 | 5/1967 | Mott et al. | 340/172.5 |
| 3,328,763 | 6/1967 | Rathbun et al. | 340/172.5 |

*Primary Examiner*—Harvey E. Springborn
*Attorney*—Charles R. Lepchinsky

[57] ABSTRACT

An electronic desk top calculator wherein digit data is entered into an entry register, and arithmetic and other control functions are initiated, by means of a keyboard, and wherein the entered data is stored in an automatic sequential access store. The entry register and at least one of the registers of the automatic sequential access store are displayed in superadjacent rows of juxtapositioned digits with like-order digits aligned column-by-column. Whenever new data is entered, any data previously contained in the entry register and the registers of the automatic sequential access store is shifted to the next higher order register in the store. Similarly, on the initiation of any function which removes the data from the entry register, or which combines the data in the entry register with the data in the next higher order register in the store as the result of a mathematical function, any data contained in the remaining registers of the store is shifted to the next lower order register of the store.

20 Claims, 9 Drawing Figures

CALCULATOR HAVING A SEQUENTIAL ACCESS STACK

STATEMENT OF RELATES CASES

This application is a continuation of applicant's copending application, Ser. No. 725,960, filed May 1, 1968 now abandoned, which is a continuation of U.S. Pat. application Ser. No. 366,235, filed May 11, 1964, now abandoned.

SUMMARY OF THE INVENTION

The invention comprises an electronic desk top calculator having a novel internal organization. The calculator memory comprises a recirculating memory unit having an entry registry, an automatic sequential access store having a plurality of registers, and at least one direct access storage register. A shifting means is provided for shifting the contents of the several registers in accordance with the following scheme.

Whenever numeric data is entered into the calculator via an operator-actuated keyboard, the contents of the entry registers are shifted into the first registr in the automatic sequential access store and the contents of each one of the registers in the automatic sequential access store are shifted up to the next adjacent register in the store. Similarly, when RECALL function is specified by one of the keyboard keys, the contents of the direct access storage register are shifted into the entry register, the contents of the entry register are shifted into the first register in the automatic sequential access store and the contents of each one of the registers in the automatic sequential access store are shifted up to the next adjacent register in the store.

Whenever an arithmetic function is specified by the actuation of an appropriate key by the operator, the contents of the entry register and one of the automatic sequential access store registers are combined in accordance with the specified function, the result is automatically placed in the entry register, and the contents of each one of the automatic sequential access store registers are automatically shifted down to the next adjacent register in the store. Similarly, when STORE function is specified by one of the keyboard keys, the contents of the entry register are shifted into the direct access storage register, the contents of the first automatic sequential access store register are shifted into the entry register, and the contents of each one of the remaining automatic sequential access store registers are shifted down to the next adjacent register in the store.

The contents of the entry register and at least one of the registers in the automatic sequential access store are displayed in superadjacent rows of juxtapositioned digits, with like-order digit aligned column-by-column. The display thus provides a visual indication of the order of entry of numeric data into the calculator memory unit, as well as the actual contents of the display registers.

For a fuller understanding of the nature and advantages of the invention, reference should be had to the following description taken in conjunction with the accompanying drawings.

DESCRIPTION OF THE PREFERRED EMBODIMENT

Figure 1:
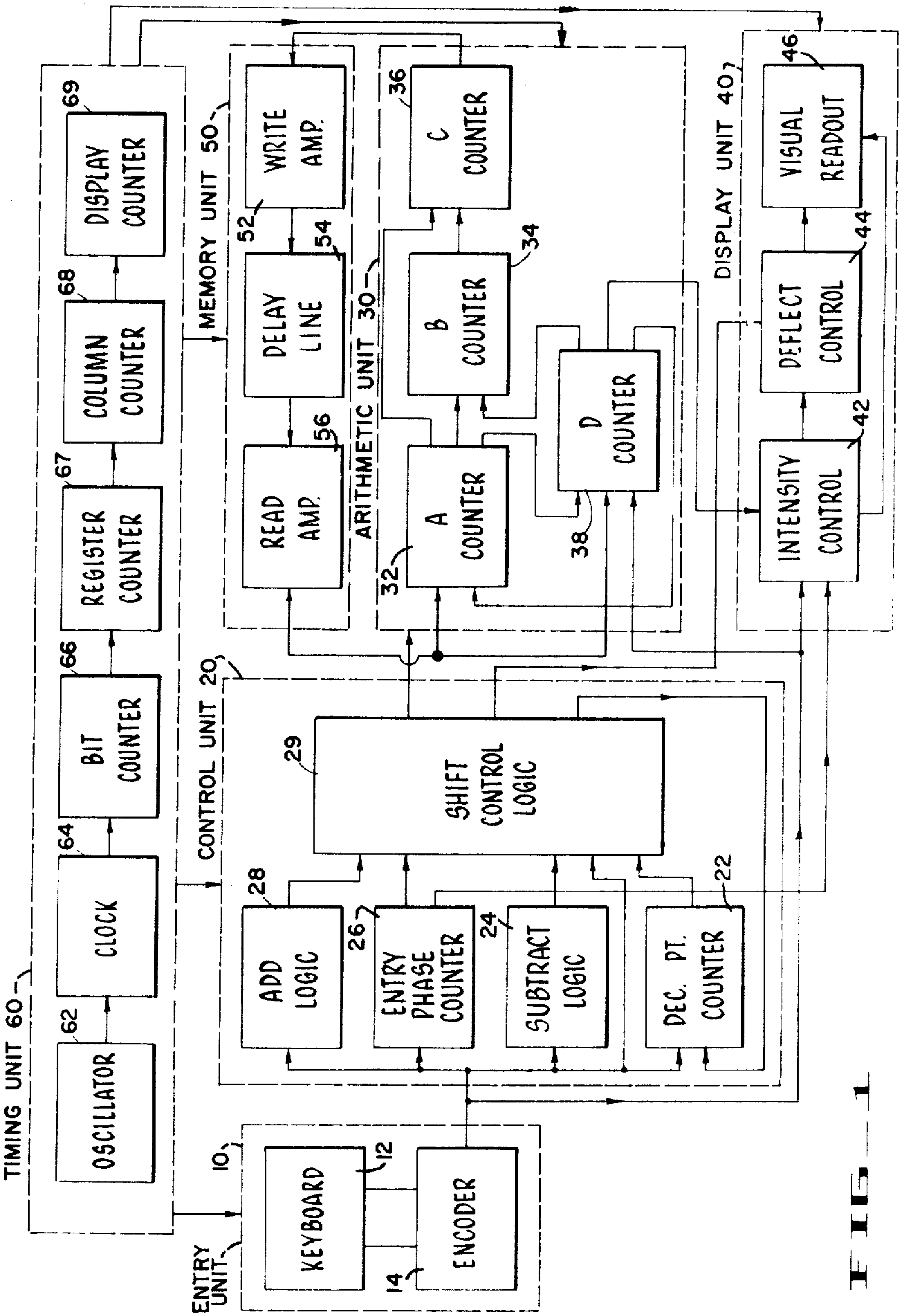
FIG. 1 is a block diagram of the calculator embodying the invention.

FIG. 1 is a block diagram of a calculator embodying the invention. In the ensuing description, reference is made to several sections and any FIGS. above 9 contained in U.S. Pat. application Ser. No. 319,704 filed Oct. 29, 1963 by R. A. Ragen, now U.S. Pat. No. 3,546,676 issued Dec. 8, 1970 and assigned to the assignee of the present invention, the disclosure of which is incorporated herein by reference.

In FIG. 1, the six basic units of the calculator are indicated by broken rectangles, while the major components included in each basic unit are indicated by solid rectangles. Interconnections between the various components and units are generally indicated in FIG. 1 by solid arrowed lines. The actual structure and specific interconnections of the comonents can be ascertained by reference to the sections and figures of the aforementioned Ragen patent indicated below. In the ensuing description, those referenced figures which comprise portions of the logic diagram (Section 16.1) are enclosed in parentheses, while those figures which comprise portions of the more detailed circuit diagram (Section 15.4) are not.

As shown in FIG. 1, an entry unit 10 is coupled to a control unit 20, an arithmetic unit 30, and a display unit 40. Entry unit 10 comprises a keyboard 12 and an encoder 14. As shown in FIGS. 182–185 (FIGS. 297,298) keyboard 12, which enables operator entry of numric data and control of functons to be performed by the calculator, comprieses a plurality of digit keys 0, 1, . . . 9, a plurality of function keys, e.g., ADD, SUBTRACT, CLEAR, etc., and their associated switches. Encoder 14, which serves to translate the actuation of various keys into signals which enable selected components of control unit 20, arithmetic unit 30, and display unit 40, comprises the components specified in Section 16.1.5 and shown in detail in FIGS. 182–189, 196, 197, 225–234, and 246 (FIGS. 297, 298).

Control unit 20, which generally produces control signals which direct the flow of data through arithmetic unit 30 comprises a decimal point counter 22, a subtract logic circuit 24, an entry phase counter 26, an add logic ciruit 28, and a shift cntrol logic circuit 29. The inputs of the first four of these components are each coupled to encoder 14, while their outputs are each coupled to shift control logic 29. Shift control logic 29 is coupled to arithmetic unit 30, to display unit 40, and to the input side of decimal point counter 22. The output of entry phase counter 26 is additionally coupled to intensity control circuit 42 of display unit 40.

Decimal point counter 22, which provides control signals to shift control logic 29 during decimal align, multiply, and divide, comprises four flip-flops interconnected as shown in FIG. 240 (FIG. 302) and having inputs as specified in these figures. The outputs of the decimal point counter flip-flops are connected to various portons of shift control logic 29, e.g., to the inputs of gate 40 as shown in FIG. 243 (FIG. 302).

Entry phase counter 26, which provides control signals to add logic 28, subtract logic 24, shift control 29, and intensity control 42, comprises three flip-flops interconnected as shown in FIG. 238 (FIG. 301) and having inputs as specified in these FIGS. The outputs of the entry phase counter flip-flops are connected to portions of add logic 28 and subtract logic 24 as shown in FIG. 228, and to various portions of shift control logic 29, e.g., to gates 74 and 76 which are coupled to gates 80 and 89, respectively, as shown in FIGS. 254, 255, and 257 (FIGS. 304, 306).

Add logic 28 and subtract logic 24, which provide enabling signals to shift control logic 29 during ADD and SUBTRACT operations, comprise an add flip-flop and a subtract flip-flop whose inputs are connected as shown in FIG. 228 to the specified outputs of encoder 12 and entry phase counter 26, and gate 6, the inputs to which are the set outputs of the add and subtract flip-flops as shown in FIG. 233. The outputs of add logic 28 and subtract logic 24 are coupled to shift control logic 29, e.g., via gates 15, 26, and 48 to gate 78 as shown in FIGS. 236, 239, 247, and 256 (FIGS. 301, 303, 306).

Shift control logic 29, which provides several shift control signals which control the path of data through arithmetic unit 30 during the various states of the calculator as described below, comprises numerous logic elements which are interconnected as shown in FIGS. 225–294 of the above-mentioned circuit diagram (FIGS. 297–313). For example, gates 84, 86, 85, and 81 of shift control logic 29 are coupled to A counter 32, B counter 34, C counter 36, and D counter 38, respectively, as shown in FIGS. 257, 258, and 263–275 (FIGS. 305–309). Also, gate 81 of shift control logic 29 is coupled to the horizontal staircase generator portion of deflection control circuit 44, as shown in FIGS. 211, 212, and 257 (FIGS. 306, 313).

Arithmetic unit 30, which is coupled to the other basic units as noted above, comprises four digisters 32, 34, 36, and 38 which in the preferred embodiment are counters. Each counter comprises five flip-flops interconnected in a special way and associated gates. Alternate interconnections are provided between interconnected counters. The flip-flop interconnections for A counter 32, B counter 34, C counter 36, D counter 38, as well as the counter between interconnections, are shown in FIGS. 261–265, 266–268, 272–274, and 269–271, respectively. As discussed more fully below, the output of read amplifier 56 of memory unit 50 is coupled to the input of A counter 32 and D counter 38. Further, the output of C counter 36 is coupled to write amplifier 52 of memory unit 50 via gates 101 and 102 as shown in FIGS. 275 and 276 (FIGS. 308, 309).

Display unit 40 comprises intensity control circuit 42 which is coupled to deflection control circuit 44 and visual readout device 46. Intensity control circuit 42 and deflection control circuit 44 comprise the components shown in detail in FIGS. 194, 195, 207–224, and 277–283 (FIGS. 310, 313), while visual readout device 46 comprises a cathode ray tube, the schematic for which is shown in FIG. 283.

Memory unit 50 comprises a write amplifier 52, a delay line 54, and a read amplfier 56. Write amplifier 52, which is shown in detail in FIG. 201, is coupled to delay line 54 as shown in FIG. 276. Delay line 54 is coupled to read amplifier 56 in the manner illustrated in FIG. 276. Read amplifier 56, which is shown in detail in FIG. 198, is coupled to A counter 32 of arithmetic unit 30 via gate 90 as shown in FIGS. 260 and 261 (FIG. 306). Read amplifier 56 is also coupled to D counter 38 of arithmetic unit 30 via gate 89 as shown in FIGS. 260 and 261 (FIG. 306).

Timing unit 60, which provides timing signals to the other five basic units, comprises six major components—an oscillator 62, a clock 64, a bit counter 66, a register counter 67, a column counter 68, and a display counter 69. Oscillator 62, shown in detail in FIG. 200, is coupled to clock 64 via gate 99 as shown in FIG. 284. Clock 64, in turn, is coupled to the first of a series of interconnected flip-flops, for the first three of which comprise bit counter 66, as shown in FIG. 286. Bit counter 66 is coupled to register counter 67, which comprises the next four interconnected flip-flops as shown in FIGS. 286 and 288. Register counter 67 is coupled to column counter 68, which comprises the succeeding four interconnected flip-flops as shown in FIG. 290. Column counter 68 is coupled to display counter 69 via gates 120 and 122 as seen in FIG. 291 and gate 123 as shown by FIG. 293. The interconnections between the various components of timing unit 60 and the other basic units are schematically portrayed in the logic diagram (FIGS. 297–313) and specifically shown in the circuit diagram, FIGS. 225–294.

GENERAL OPERATION

The general operation of the preferred embodiment of FIG. 1 can be best understood by assuming a problem, for example addition of the digits 2 and 7. To begin, the operator actuates the digit 2 key on keyboard 12. This keyboard information is translated into machine instruction signals by encoder circuit 14 and presented to the input circuit of D counter 38 but does not enter the D counter at this time. Encoder circuit 14 also presents decimal alignment information to decimal point counter 22 asnd acuases entry phase counter 26 to begin cycling through a predetermined program.

If the digit 2 is the first digit of a number to be entered (which is true in this case), entry phase counter 26 initiates a SHIFT UP, by actuating shift control logic circuit 29, whereby the contents of the recirculating registers R1, R2, R3, and R4 of the delay line memory are shited up. This step requires a single pass of the field word through arithmetic unit 30 and, as discussed in detail in Section 16.7.5, results in all zeros in register R1. The SHIFT UP is accomplished by transfer of the data from A counter 32 to D counter 38, and simultaneously from the D counter to B counter 34 during every R1, R2, R3, and R4 register time. It is noted that during SHIFT UP, there is no direct tranfer from A counter 32 to B counter 34 during any of these register times. Also, during RS and RO register times, data follows the normal path from A counter 32 to B counter 34 to C counter 36.

Entry phase counter 26 next initiates a SHIFT LEFT R1 by actuating shift control logic 29, whereby the contents of register R1 are shifted one column to the left. As discussed more fully in Section 16.4, this SHIFT LEFT R1 first causes the data (the digit 2) that was initially presented to the input circuit of D counter 38 to be entered into the D counter, and then causes this data to be inserted into the memory loop at the C2R1 position, i.e., during Column 2, Register-1 time. SHIFT LEFT R1 is accomplished by initiating a tranfer from A counter 32 to D counter 38 and simultaneously from the D counter to B counter 34 during each R1 register time. At such time, there is no direct transfer from A counter 32 to B counter 34. During the remaining register times (RS, RO, R2, R3, and R4) data follows the normal path. As with the SHIFT UP step, SHIFT LEFT R1 takes place during one pass or cycle through arithmetic unit 30.

After the SHIFT LEFT R1 step, the calculator returns to the IDLE condition. Digit 2 now appears in the C2R1 position of the recirculating information.

During the SHIFT UP and SHIFT LEFT procedures and during any rearrangement or modification of the data contained in the respective register positions, visual readout device 46 is blanked. Blanking is achieved by applying a blanking signal from entry phase counter 26 to display intensity control circuit 42. It should be noted that, as discussed more fully in Sections 16.3 and 16.11, the register contents are displayed by visual readout device 46 during the cleared and the IDLE conditions only. At other times, entry phase counter 26 serves to blank readout device 46.

The operation of the calculator during DISPLAY mode is as follows. When data which is to be displayed appears in A counter 32, the data is shifted by parallel transfer or broad-siding into D counter 38. While in the D counter, this data controls display intensity control circuit 42, so that the proper segments that are necessary to trace out the digit on the screen of the cathode ray tube display are selected and intensified for visual readout.

Display deflection control circuit 44 deflects the electron beam of the cathode ray tube display so that the beam traverses the configuration of a figure eight and a decimal point for each column position of each register to be displayed. However, only those segments that correspond to the digit in the D counter will be intensified, while the other segments or strokes of the electron beam will be blanked. Display intensity control circuit 42 acts to energize the cathode ray tube, whereas display deflection control circuit 44 serves to deflect the electron beam generated by the cathode ray tube. For a more detailed discussion of machine operation during the DISPLAY mode, see Section 16.11.

As noted above, during the IDLE condition, the flow of data in memory unit 50 and arithmetic unit 30 is from delay line 54 to read ampliier 56, serially to A counter 32, then parallel or broadside from the A counter to B counter 34, parallel from the B counter to C counter 36, serially from the C counter to write amplifier 52 and then back to delay line 54. In this manner, a closed memory loop is formed in hich information may by cycled repeatedly.

After entry of the digit 2, the ENTER key of the keyboard is depressed. Actuation of this key establishes that the last digit of a number has been entered into the memory unit. In this example, 2 is the first and last digit of the number. Entry phase counter 26 then causes shift control logic 29 to decimal align the number now entered in register R1.

The operator next inserts the next digit word, which in this example is the digit 7, and the calculator follows the same format as set forth above. In this case, during the SHIFT UP step, the digit word 2 is shifted up from register R1 to the next register R2, and then the digit word 7 is entered into register R1.

The operator then actuates the ADD function key in order to effectuate a summation of the digits 2 and 7. When the ADD key is actuated, encoder circuit 14 translates this action into machine commands. One output signal from encoder circuit 14 triggers entry phase counter 26 to cycle through a predetermined program, which is built into the machine.

The first step of the ADD program is decimal alignment, if necessary. This alignment is controlled by shift control logic 29 and decimal point counter 22. Shift control logic 29 shifts information in the R1 register to the left, until decimal point counter 22 determines that the number in register R1 is decimally aligned. For a more detailed discussion of machine operation during decimal alignment, see Section 16.6.

Entry phase counter 26 next causes the information in registers R1, R2, R3, and R4 to be shifted down by one register. The SHIFT DOWN action is controlled by shift control logic 29, which causes a direct transfer from A counter 32 to C counter 36 during R1, R2, R3, and R4 register times. As a result, the two digit words or numbers 2 and 7 which are to be added are placed in the R1 and R0 (M/D) registers, respectively. For a more detailed discussion of machine operation during this SHIFT DOWN action, see Section 16.7.3. Entry phase counter 26 then activates add logic circuit 28 so that addition can be performed by arithmetic unit 30.

Addition is performed by adding like-order digits of the data contained in registers R0 and R1 after the above-described SHIFT DOWN action. For each order, this is accomplished by tranferring the R0 digit into A counter 32, inhibiting reset of the A counter, and then tranferring the R1 digit into A counter 32 on top of the R0 digit. To illustrate, using the above example the R0 digit 7 is first sequenced into A counter 32 from read amplifier 56. Next, the normal between-tranfer resetting of the A counter to zero is inhiited by shift control logic 29 in response to an enabling signal from add logic 28. Then, the R1 digit 2 is sequenced into A counter 32. Since A counter 32 still contains the count of seven at the beginning of this latter step, the result of this latter sequencing is a count of nine $(7 + 2 = 9)$ in the A counter. This resulting digit, the sum of the two digits, is then tranferred in the normal way to B counter 34, then to C counter 36, etc. The above sequence A—inhibit reset A—sequence A action is followed for all orders C2–C14 of the R0 and R1 register digits, and is accomplished in one pass of the field word through the arithmetic unit 30. Upon conclusion of the ADD operation, the calculator returns automatically to IDLE condition and DISPLAY mode. For a more detailed discussion of machine operation during ADD, see Section 16.7.9.

To simplify illustration of the SUBTRACT operation, assume that digit words representing a minuend and a subtrahend have already been entered in registers R2 and R1, respectively, and decimal aligned, in the manner described above. The operator then actuates the SUBTRACT function key, which action is translated by encoder circuit 14 into machine commands. One output signal from encoder circuit 14 triggers entry phase counter 26, which causes the decimally aligned contents of registers R1, R2, R3, and R4 to be shifted down by one register in the same manner as has been described above in the discussion of the ADD operation so that the minuend and subtrahend are shifted into the R1 and R0 (M/D) registers, respectively. Next, entry phase counter 26 actuates subtract logic circuit 24 so that subtraction can be performed by arithmetic unit 30.

Subtraction is performed by complementary addition of like-order R0 and R1 digits, that is, each R1 digit is added to the complement of each like-order R0 digit. Thi is accomplished as follows. In response to an enabling signal from subtract logic 24, shift control logic 29 causes the R0 digit from read amp 56 to sequence D counter 38. Since, as described in Section 16.2.6, D counter 38 is a recedable digister, this sequencing of the D counter results in the complement of the R0 digit being developed in D counter 38. The complemented R0 digit is then parallel tranferred or broadsided into A counter 32. The R1 digit is next sequenced into the A counter on top of the complemented R0 digit. The resulting digit, representing the remainder or difference between the original, like-order R1 and R0 digits, is then transferred in the normal way to B counter 34, then to C counter 36, etc. This action is followed for all orders C2–C14 of the R0 and R1 register units and is accomplished in one passs of the field word through arithmetic unit 30.

At the end of this pass, if originally the subtrahend was larger than the minuend, the contents of the R1 register will represent the complement of the desired answer. In such a case, shift control logic 29, in response to an enabling signal from subtract logic 24, caues R1 data to be complemented and the arithmetic sign to be changed during a second pass of the field word through arithmetic unit 30. The arithmetic sign of the R1 data is changed by adding one of the C1R1 digit position (the sign digit position). The R1 data is complemented by sequencing D counter 38 directly from read amplifier 56 for each R1 digit. As noted above, sequencing the D counter causes the complement of the sequencing digit to be developed in D counter 38. This complemented digit is then parallel transferred to B counter 34, while the normal A counter to B counter transfer is simultaneously inhibited by shift logic 29. From B counter 34, the complemented R1 digit is transferred to C counter 36 in the normal way. After the R1 data has been complemented, the calculator returns automatically to IDLE condition and DISPLAY mode. For a more detailed discussion of machine operation during SUBTRACT, see Sections 16.7.10 and 16.7.11.

To simplify illustration of the MULTIPLY operation, assume that digit words representing a multiplier and a mulitplcand have already been entered in registers R2 and R1, respectively, and decimal aligned. The operator than actuates the MULTIPLY function key, which action is translated by encoder 14 into machine commands. One output signal from encoder circuit 14 triggers entry phase counter 26, which directs shift control logic 29 to shift the decimally aligned contents of register R1 down into the R0 register, and clear the R1 register. This is achieved by transferring data from A counter 32 to C counter 36 during each R1 register time and is discussed in detail in Section 16.7.12.

Multiplication is performed by repeated addition of the multiplicand in register RO to the contents of register R1 a number of times which is controlled by the mulitplier in register R2. This is accomplished by shifting R2 data left, leaving the highest order or most significatnt R2 digit (MSDR2) in D counter 38, and using this digit to control the number of ADD cycles, During each ADD cycle, the contents of register R0 (the multiplicand) are added to the contents of register R1 (initially zero). D counter 38 is sequenced after each ADD cycle is completed. When the digit in the D counter has been receded or counted down to zero, shift logic 29 cuases the contents of register R1 to be shifted one column to the left during the next pass of the field word through arithmetic unit 30. At the beginning of this data pass, the digit in D counter 38 (MSDR1) is placed in the least significant digit (LSD) position of register R2 (the C2R2 position), while the most significant R2 digit (MSDR2) is left in the D counter at the end of this pass. This digit is then used to control the number of ADD cycles as described above.

Successive series of repetitive ADD cycles and SHIFT LEFT R1 and SHIFT LEFT R2 steps are performed until each digit of the original multiplier in register R2 has been used to control the repetitive ADD cycles. Since MSDR1 is relocated in LSDR2 2 once for each series of ADD cycles by the combined action of SHIFT LEFT R1 and SHIFT LEFT R2, after the original LSDR2 has been placed in D counter 38 and the D counter has been receded to zero, the product of the original multiplier and multiplicand will be located in register R2.

Entry phase counter 26 then causes shift logic 29 to shift down the contents of registers R2, R3, and R4 by one register. With the product now located in register R1, and the MULTIPLY operation completed, the calculator returns automatically to IDLE condition and DISPLAY mode. For a more detailed discussion of machine operation during MULTIPLY, see Sections 16.7.4 and 16.8.

To simplify illustration of the DIVIDE operation, assume that digit words representing a dividend and a divisor have already been entered in registers R2 and R1, respectively, and decimal aligned. The operator then actuates the DIVIDE function key, which action is translated by encoder circuit 14 into machine commands. One output signal from encoder circuit 14 triggers entry phase counter 26, which directs shift control logic 29 to shift the decimally aligned contents of register R1 down into the R0 register, and clear the R1 register. This is achieved in the same manner as discussed above in the description of the MULTIPLY operation.

Division is performed by repeated subtraction of the divisor in register R0 from the dividend which is progressively shifted from register R2 into register R1 and counting the number of successful subtractions. Subtraction is performed by complementary addition as described above in the discussion of the SUBTRACT operation. During the DIVIDE operation, the contents of register R0 are substracted from the contents of register R1 and 1 is added to register R2 whenever the remainder in register R1 is positive. When the remainder is negative, entry phase counter 26 causes add logic circuit 28 to restore the former contents of register R1 by adding R0 to R1. Next, entry phase counter 26 causes shift logic 29 to shift the contents of register R2 one column to the left during one pass of the field word through arithmetic unit 30, leaving MSDR2 in D counter 28 at the end of the pass. Shift logic 29 then causes the contents of register R1 to be shifted left during the next pass of the field word through arithmetic unit 30. At the beginning of this data pass, the digit in D counter 38 (MSDR2) is placed in the least significant digit position of register R1 (C2R1 position). After this SHIFT LEFT R1 step, repetitive subtraction of R0 from R1 is again performed, 1 is added to register R2 for each successful subtraction until the remainder in register R1 is again negative, after which the contents of register R1 are restored and the above shifting operations are again performed.

Successive series of repetitive SUBTRACT cycles and SHIFT LEFT R2 and SHIFT LEFT R1 steps are performed until the least significant digit of register R2 has been shifted into the least significant digit position of Register R1, successive subtract cycles have been performed, a negative remainder in register R1 has been obtained, and the contents of register R1 have been restored. Since 1 has been added to register R2 for each successful SUBTRACT cycle and since this sum has been shifted left once during each SHIFT LEFT R2 step, after the final restoration of the contents of register R1, the quotient of the original dividend and divisor will be located in register R2.

Entry phase counter 26 next causes shift logic 29 to SHIFT DOWN the contents of register R2, R3, and R4 by one register. With the quotient now located in register R1, and the DIVIDE operation completed, the calculator returns automatically to IDLE condition and DISPLAY mode. For a more detailed discussion of machine operation during DIVIDE, see Sections 16.6.4 and 16.9.

In addiion to the above-described data handling operations and suboperations, which set forth calculator operation during the four basic arithmetic operations of ADD, SUBSTRACT, MULTIPLY, and DIVIDE, the calculator is also capable of performing other operations and suboperations.

Once such operation is STORE operation by which data contained in entry register R1 is stored in direct access storage register RS. STORE operation is initiated by operator actuation of the store function key, which is translated by encoder circuit 14 into machine commands. An output signal from encoder circuit 14 triggers entry phase counter 26 to cycle through a predetermined program. During the first step of the STORE program, the information in registers R1, R2, R3 and R4 is shifted down by one register. The SHIFT DOWN action is controlled by shift control logic 29, in the manner described above in connection with ADD function, so that the contents of registers R1, R2, R3, and R4 are placed in registers R0 (M/D), R1, R2, and R3, respectively. Next, shift control logic 29 causes the contents of register R0(M/D) to be shifted down into register RS. This is accomplished by transfer of the data from A counter 32 to C counter 36 during each RO(M/D) register time. After STORE operation has been concluded by the completion of this second shifting suboperation, the calculator returns automatically to IDLE condition and DISPLAY mode. For a more detailed discussion of machine operation during STORE, see Section 16.7.7.

Complementary to the STORE operation is the RECALL operation by which data contained in direct access storage register RS is recalled to the entry register R1. RECALL operation is initiated by operator actuation of the RECALL function key, which is translated by encoder circuit 14 into machine commands. An output signal from encoder circuit 14 triggers entry phase counter 26 to cycle through a predetermined program. During the first step of the RECALL program, the information in registers R1, R2, R3, and R4 is shifted up by one register and the information in register R1 is also retained therein. This action, termed SHIFT UP (R), is controlled by shift logic 29 and is a modification of the SHIFT UP action described above in connection with digit entry. SHIFT UP (R) is accomplished by transfer of the data in A counter 32 to both B counter 34 and D counter 38 during each R1 register time; and by transfer of data in the A counter to the D counter and simultaneously from the D counter to the B counter during each R2, R3, and R4 register time. During RS and RO register times, data follows the normal path. Next, shift control logic causes the contents of register RS to be shifted up into register R1 and also retained in register RS. This is accomplished by transfer of the data from A counter 32 to both B counter 34 and D counter 38 during each RS register time; and by transfer of the data from the D counter to the B counter during each R1 register time. The contents of register R1 at the beginning of this action are destroyed by inhibiting any transfer out of A counter 32 and by resetting A counter 32 to zero during each R1 register time. During R0, R2, R3, and R4 register times, data follows the normal path. After RECALL operation has been concluded by the completion of this second shifting suboperation, the calculator returns automatically to IDLE condition and DISPLAY mode. For a more detailed discussion of machine operation during RECALL, see Section 16.7.8.

Although the caluclator of the FIG. 1 embodiment is capable of performing still other operations and suboperations, these are not considered necessary to an understanding of the invention disclosed herein and accordingly are not discussed.

Timing unit 60 provides the timing signals that determine the time relations between the various operations described herein. Clock circuit 64, which is driven by the output of oscillator 62, produces one pulse for each bit time. These pulses are applied in turn to bit counter 66, register counter 67, column counter 68 and display counter 69, the outputs of each of which define a discreet time interval related to the presentation of the data.

Although oscillator 62 runs continuously, the output of clock 64 is stopped by the leading portion of the first column time, i.e., CORS register time. Clock 64 is started by the appearance of the leading synchronization pulse each time the data is first made available at the output end of delay line 54. In this manner, the data is synchronized so that portions thereof may be properly identified relative to their respective register positions as the data is read off delay line 54 and also while the data is in the various portions of arithmetic unit 30. For a more detailed discussion of this start-stop feature of timing system 60, see Section 16.5.

The external manifestations of the operation of the internal organization of the FIG. 1 calculator embodying the invention are illustrated in FIGS. 2–9, which depict the display screen DS and the calculator keyboard after sequential operation by the operator of the various keys required to solve the following arithmetic problem:

$$233 + 1.7 + 0.6 = 235.3$$

In each one of FIGS. 2–9, the condition of the display screen DS is depicted after actuation of the last of the shaded keys. As is evident from these figures, the contents of four registers are displayed in superadjacent rows of juxtapositioned digits, with like-order digits vertically aligned column-by-column. The bottom row R1 is reserved for displaying the contents of register R1, the entry register. The next row R2 is reserved for displaying the contents of register R2, the first register of the automatic sequential access store. Rows 3 and 4 are reserved for displaying the contents of registers R3 and R4, respectively, the remaining registers of the automatic sequential store.

Figure 2:
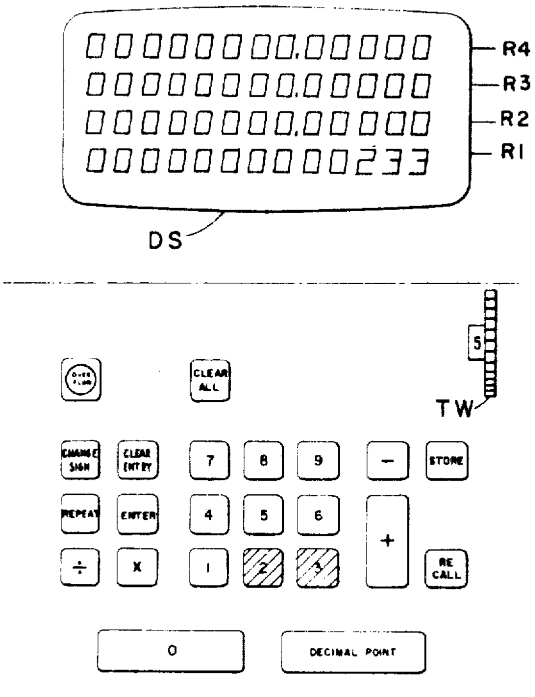
FIGS. 2–9 depict a display screen and keyboard of a calculator illustrting the automatic seqential access store.
Figure 3:
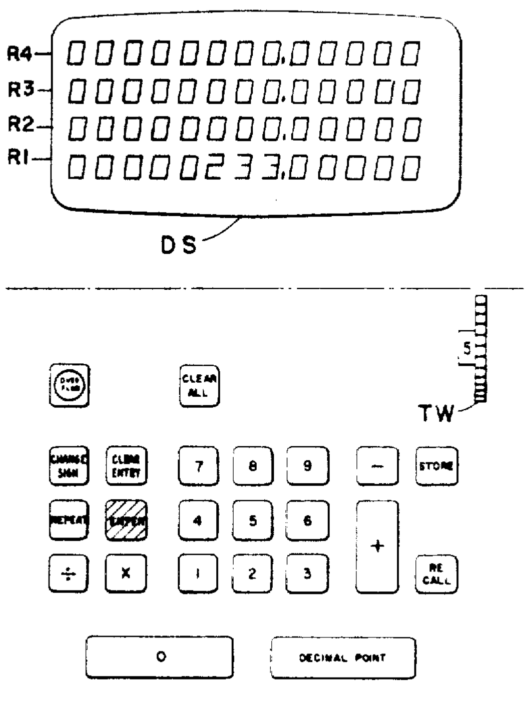

Solution of the above problem proceeds as follows. Beginning with all zeros in registers R1, R2, R3, and R4, FIG. 2 illustrates the display screen DS after sequential actuation of the 2, 3, and 3 digit keys. As can be seen from the figure, the factor 233 has been entered into entry register R1, but not yet decimally aligned. As shown by FIG. 3, actuation of the ENTER function key results in decimal alignment of the number. Since the decimal point thumbwheel TW is set to the number 5, the number is displayed with five decimal places to the right of the decimal point. This completes entry of the first factor of the above problem.

Figure 4:
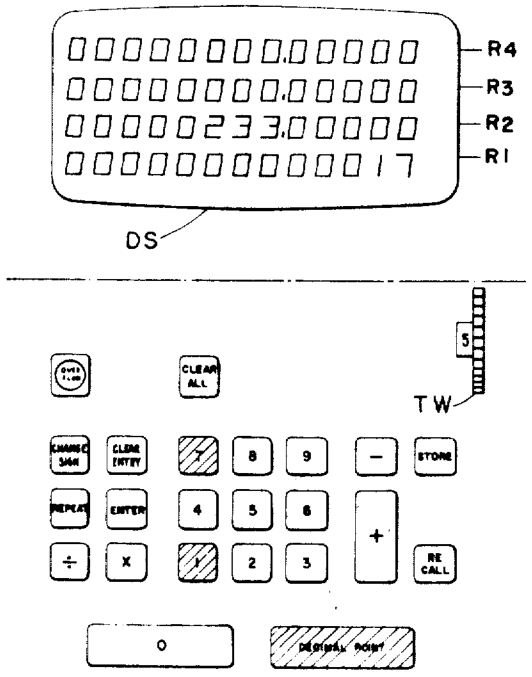
Figure 5:
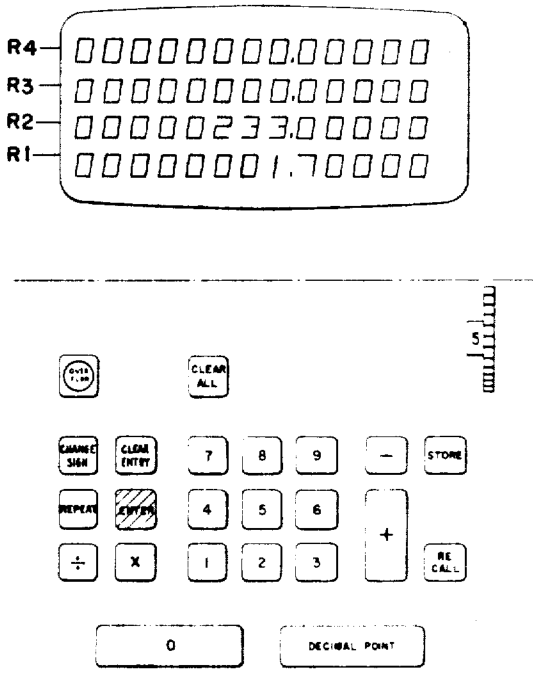

FIG. 4 illustrates the display screen DS after actuation of the 1, decimal point, and 7 digit keys. The first factor, formerly in entry register R1, has been shifted up into register R2 and the second factor has been entered into entry register R1, but not yet decimally aligned. As shown in FIG. 5, actuation of the ENTER function key results in decimal alignment of the contents of entry register R1, completing entry of the second factor.

Figure 6:
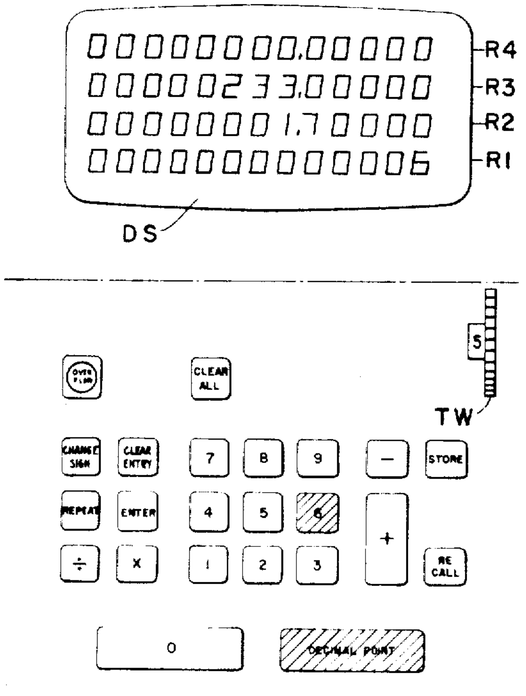
Figure 7:
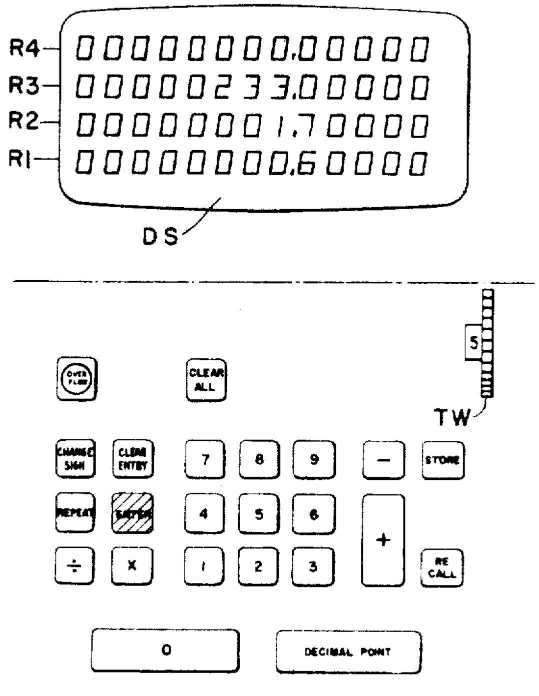

Similarly, FIGS. 6 and 7 illustrate entry and decimal alignment from the third factor 0.6 in the above problem. The former contents of registers R2 and R1 have been shifted up to registers R3 and R2, respectively, and the third factor has been decimally aligned in entry register R1.

Figure 8:
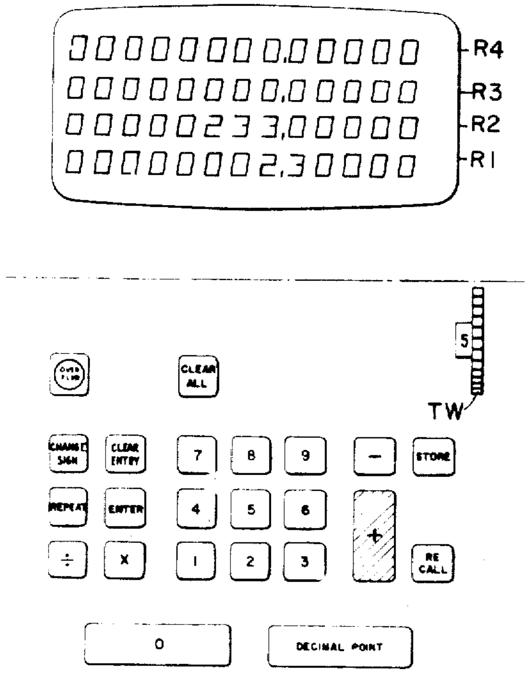
Figure 9:
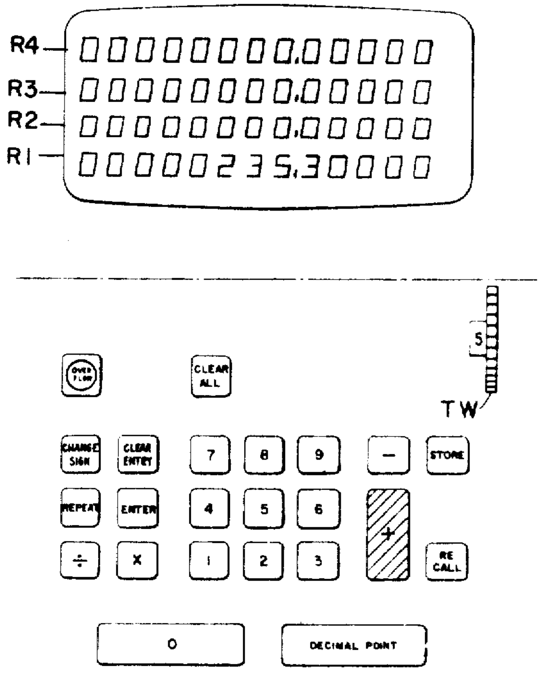

With all three factors entered, actuation of the ADD function key results in addition of the contents of entry register R1 and register R2 of the automatic sequential access store. As can be seen in FIG. 8, the sum 2.3 of these two factors has been automatically placed intro entry register R1 and the factor 233 has been automatically shifted down to register R2. The second actuation of the ADD function key, as shown in FIG. 9, again results in addition of the contents of entry register R1 and register R2 of the automatic sequential access store, with the sum 255.3 of these two factors being automatically placed into entry register R1.

As will now be evident, the calculator embodying the invention provides the operator with directly readable information concerning the condition of the entry register R1 and the registers R2, R3, and R4 of the automatic sequential access store, as well as the order of entry of the data contained therein. For example, with the calculator in the condition shown in FIG. 7, the operator is informed at a glance that registers R1, R2, and R3 all contain non-zero numerical data, register R4 is empty, and that factor 233 was entered first into the calculator, followed by factor 1.7 and lastly factor 0.6.

While the invention has been described as having three automatic sequential access registers R2, R3, and R4, more registers may be provided as desired. Further, more or less of the automatic sequential access store registers may be displayed as particular applications dictate. In addition, the contents of direct access storage register RS may be displayed if deemed desirable in a particular application. Therefore, the above description and illustrations should not be construed as limiting the scope of the invention, which is solely defined by the appended claims.

What is claimed is:

1. In an electronic calculator:

a memory comprising a plurality of interlaced registers, including an entry register, forming a last-in-first-out stack, each said register having an ordered plurality of digit compartments for storing digit words representing an arithmetic number, like-order digit compartments of said plurality of registers being juxtapositioned in said memory;

entry means coupled to said memory for entering digit words into said entry register;

first shifting means responsive to the actuation of said entry means for shifting the contents of each of said registers to the next adjacent one of said registers in a direction in said stack away from said entry register;

arithmetic means coupled to said memory for arithmetically combining the contents of said entry register and another one of said registers to form an arithmetic result;

result entry means for placing said result in said entry register; and means for displaying the contents of at least some of said registers comprising said last-in-first-out stack as a plurality of superadjacent rows of juxtapositioned digits, individual ones of said rows containing the digits of individual ones of said registers, said display means including means for aligning like-order digits of different rows in columnar fashion.

2. The calculator of claim 1 further including second shifting means responsive to the actuation of said arithmetic means for shifting the contents of the remaining ones of said registers in a direction in said stack toward said entry register when said contents of said entry register and said another one of said registers are combined by said arithmetic means to form said arithmetic result.

3. The calculator of claim 1 further including a keyboard having a plurality of arithmetic function keys coupled to said arithmetic means for enabling said arithmetic means.

4. The calculator of claim 1 wherein said memory includes an acoustic delay line.

5. In an electronic desk top calculator, a recirculating memory unit including a direct access storage means having a register RS, an entry register R1, and an automatic sequential access store comprising a plurality of registers R2, R3, . . . , RN; a plurality of function keys; and a sequential access control means for shifting the contents of said registers, said last-named means including inward shifting means responsive to the actuation of one of said function keys for transferring the contents of said entry register R1 and said registers R2, R3, . . . , RN-1 to the next higher-order registers R2, R3, . . . , RN in said sequential access store, and means responsive to the actuation of said one of said function keys for transferring the contents of said register RS to said entry register R1.

6. The apparatus of claim 5 wherein said calculator further includes means for displaying the contents of said entry register R1 and each one of said plurality of registers R2, R3, . . . , RN in a separate one of a plurality of superadjacent rows of juxtapositioned digits, said display means including means for aligning like-order digits of said registers R1, R2, . . . , RN in columnar fashion, whereby said display means indicates the order of entry of said contents of said registers R1, R2, . . . , RN.

7. The apparatus of claim 5 wherein said calculator further includes display means for displaying the contents of said entry register R1 and at least one of said registers of said sequential access store in a separate one of a plurality of superadjacent rows of juxtapositioned digits, said display means including means for aligning like-order digits of said displayed registers in columnar fashion, whereby said display means indicates the order of entry of said contents.

8. In an electronic desk top calculator, a recirculating memory unit inclding a direct access storage means having a register RS, an entry register R1, and at least one automatic sequential access store comprising a plurality of registers R2, R3, . . . , RN; a plurality of function keys; and a sequential access control means for shifting the contents of said registers, said last-named means including means responsive to the actuation of one of said function keys for transferring the contents of said entry register to said register RS and outward shifting means responsive to the actuation of said one of said function keys for transferring the contents of each of said registers R2, R3, . . . , RN to the next lower-order register R1, R2, . . . , RN−1, respectively.

9. The apparatus of claim 8 wherein said calculator further includes means for displaying the contents of said entry register R1 and each one of said plurality of registers R2, R3, . . . , RN in a separate one of a plurality of superadjacent rows of juxtapositioned digits, said display means including means for aligning like-order digits of said registers R1, R2, . . . , RN in columnar fashion, whereby said display means indicates the order o4 emission of said contents of said registers R1, R2, . . . , RN.

10. The apparatus of claim 8 wherein said calculator further includes display means for displaying the contents of said entry register R1 and at least one of said registers of said sequential access store in a separate one of a plurality of superadjacent rows of juxtapositioned digits, said display means including means for aligning like-order digits of said displayed registers in columnar fashion, whereby said display means indicates the order of entry of saic contents.

11. The apparatus of claim 8 wherein said sequential access control means further includes inward shifting means responsive to the actuation of a different one of said function keys for transferring the contents of said entry register R1 and and said registers R2, . . . , RN−1 to the next higher-order register R2, R3, . . . , RN in said sequential access store, and means responsive to the actuation of said different one of said function keys for transferring the contents of said register RS to said entry register R1.

12. The apparatus of claim 11 wherein said calculator further includes means for displaying the contents of said entry register R1 and each one of said plurality of registers R2, R3, . . . , RN in a separate one of a plurality of superadjacent rows of juxtapositioned digits, said display means including means for aligning like-order digits of said registers R1, R2, . . . , RN in columnar fashion, whereby said display means indicates the order of entry and the order of emission of said contents of said registers R1, R2, . . . , RN.

13. In an electronic desk top calculator, a recirculating memory unit including an entry register R1 and an automatic sequential access store comprising a plurality of registers R2, R3, . . . , RN, each said register having an ordered plurality of digit compartments for storing digit words representing an arithmetic number, like order digit compartments of said registers being juxtapositioned in said memory; a plurality of function keys including a subplurality of mathemtical function keys; a plurality of digit keys; an arithmetic unit responsive to the actuation of said mathemtical function keys for mathematically combining the contents of said entry register R1 and said register R2 to produce resultant data; and sequential access control means for shifting the contents of said registers, said last-named means including means responsive to said mathematical function keys for placing said resultant data into said entry register R1 and outward shifting means responsive to said mathematical function keys for transferring the contents of each of said registers R3, R4, . . . , RN to the next lower-order register R2, R3, . . . , RN−1.

14. The apparatus of claim 13 wherein said calculator further includes means for displaying the contents of each one of said registers in a separate one of a plurality of superadjacent rows of juxtapositioned digits, said display means including means for aligning like-order digits of said registers in columnar fashion, whereby said display means indicates the order of emission of said contents of said registers.

15. The apparatus of claim 13 wherein said calculator further includes display means for displaying the contents of said entry register R1 and at least one of said registers of said sequential access store in a separate one of a plurality of superadjacent rows of juxtapositioned digits, said display means including means for aligning like-order digits of said displayed registers in columnar fashion, whereby said display means indicates the order of entry of said contents.

16. The apparatus of claim 13 wherein said sequential access control means further includes inward shifting means responsive to said digit keys for transferring the contents of said entry register R1 and said registers R2, R3, . . . , RN−1 to the next higher-order registers R2, R3, . . . , RN in said sequential access store.

17. The apparatus of Claim 16 wherein said calculator further includes means for displaying the contents of each one of said registers in a separate one of a plurality of superadjacent rows of juxtapositioned digits, said display means including means for aligning like-order digits of said registers in columnar fashion, whereby said display means indicates the order of entry and the order of emission of said contents of said registers.

18. In an electronic desk top calculator, a recirculating memory unit for nonaddressable data including an entry register R1 and an automatic sequential access store comprising a plurality of registers R2, R3, . . . , RN; a plurality of function keys; a plurality of digit keys; and sequential access control means for shifting the contents of said registers, said last-named means including inward shifting means responsive to said digit keys for transferring the contents of said entry register R1 and said registers R2, R3, . . . , RN−1 to the next higher-order register R2, R3, . . . , RN in said sequential access store.

19. The apparatus of Claim 18 wherein said calculator further includes means for displaying the contents of each one of said registers in a separate one of a plurality of superadjacent rows of juxtapositioned digits, said display means including means for aligning like-order digits of said registers in columnar fashion, whereby said display means indicates the order of entry of said contents of said registers.

20. The apparatus of claim 18 wherein said calculator further includes display means for displaying the contents of said entry register R1 and at least one of said registers of said sequential access store in a separate one of a plurality of superadjacent rows of juxtapositioned digits, said display means including means for aligning like-order digits of said displayed registers in columnar fashion, whereby said display means indicates the order of entry of said contents.

* * * * *